2,866,751

METHOD OF DESULFURIZING HYDROCARBON OIL USING A COBALT ZIRCONIUM CATALYST

Wilford J. Zimmerschied, Crown Point, Ind., and Paul N. Rylander, Chicago, Ill., assignors to Standard Oil Company, Chicago, Ill., a corporation of Indiana No Drawing. Application March 28, 1956
Serial No. 574,375

6 Claims. (Cl. 208—217)

This invention relates to the desulfurizing of hydrocarbon oils and in particular it concerns the use of novel catalysts for the hydrodesulfurization of hydrocarbon oils containing organic sulfur compounds.

Petroleum or other hydrocarbon oils which contain appreciable amounts of sulfur compounds are objectionable for use as fuel, lubricating oils, solvents, or cracking stocks and the like. Frequently virgin and cracked naphthas must be desulfurized before blending into gasoline or before further processing, such as hydroforming, to improve their octane number. The high sulfur components, e. g. coke still naphtha, of gasoline require desulfurization in order to produce a blended gasoline meeting the requirement of low sulfur content. A number of catalysts are available for the hydrodesulfurization of virgin naphthas, but if they are employed in hydrodesulfurizing olefinic naphthas such as thermally or catalytically cracked naphthas, they catalyze indiscriminate desulfurization and hydrogenation of the higher octane olefins to produce lower octane paraffins. The olefinic naphthas, e. g. coke still naphtha, may suffer a loss of 10 to 20 octane numbers. In addition, a considerable amount of expensive hydrogen is used in saturating the olefins.

An object of this invention is to provide a method and means for desulfurizing hydrocarbon oils which utilizes a highly active and effective hydrodesulfurization catalyst. Another object is to provide a selective desulfurization catalyst useful for desulfurizing olefinic hydrocarbon oils with a minimum consumption of hydrogen. An important object of this invention is to provide an economical method and means for achieving a high degree of desulfurization of olefinic naphthas while maintaining saturation, i. e, hydrogenation, of the olefinic components at a minimum and thereby obtaining a desulfurized olefinic naphtha whose octane number has not been substantially reduced during hydrodesulfurization. Other objects will become apparent from the detailed description of our invention.

It has been found that if an intimate mixture of a cobalt compound, which affords cobalt oxide, and a zirconium compound, which affords zirconium oxide, is calcined at a temperature between about 1400 and 2000° F., e. g. 1600° F., for 1 to 24 hours, a calcination product is produced which is a highly effective and selective desulfurization catalyst, either alone or when employed on a carrier. The cobalt compound used is one which provides cobalt oxide upon heating to the calcination temperature. Thus it may be cobalt carbonate, hydroxide, oxalate etc. The zirconium compound, similarly, is one which affords zirconium oxide at the calcination temperature. Compounds such as zirconium hydroxide, nitrate, oxide, etc. can be used. Cobalt carbonate and zirconium oxide are preferred. The intimate mixture which undergoes calcination contains the cobalt and zirconium compounds in amounts such that the molar ratio of cobalt to zirconium is between about 1:1 and 4:1. The calcination product, which may be extended with an alumina carrier if desired, is then used to desulfurize the hydrocarbon oil at a temperature between about 600° and 1000° F. in the presence of hydrogen. The hydrodesulfurization conditions are usually a pressure between 100 and 3000 p. s. i. g., about 500 to 5000 s. c. f. $H_2$/bbl. of oil and space velocities between 0.5 and 20, usually between about 2 and 10 volumes of oil/hour/volume of catalyst. The catalyst is very useful in desulfurizing petroleum naphthas, especially olefinic naphthas such as coke still naphtha.

As has been indicated the cobalt compound used in forming the catalytically active calcination product must be one which provides cobalt oxide at the calcination temperature. Examples of useful cobalt compounds are:

$CoCO_3$, $2CoCO_3 \cdot 3Co(OH)_2 \cdot H_2O$, $Co(OH)_2$, $Co_2O_3 \cdot 3H_2O$, $CoO$, $Co_3O_4$, $Co_2O_3$, $CoCl_2 \cdot 6H_2O$, $Co(NO_3)_2 \cdot 6H_2O$, $CoC_2O_4$, and the like. In the same manner zirconium compounds which exist as zirconium oxide at the calcination temperatures are used. Examples of such zirconium compounds are:

$Zr(OH)_4$, $Zr(NO_3)_4 \cdot 5H_2O$, $Zr(C_2O_4)_2 \cdot 2Zr(OH)_4$, $ZrO_2$.

Cobaltic oxide ($Co_2O_3$) and zirconium oxide ($ZrO_2$) are preferred. The mixture which is calcined should contain a molar ratio of cobalt to zirconium of between 1:1 and 4:1. When either higher or lower ratios of cobalt to zirconium are used in preparing the calcination product, the product is less effective for desulfurization. The preferred molar ratio of cobalt to zirconium in the mixture undergoing calcination is approximately 4:1.

The cobalt compound and the zirconium compound, in the desired proportions, are intimately mixed before being calcined. This may be done by ball milling the particular cobalt and zirconium compounds in the dry or wet state, preferably the latter. For example, a water or methanol slurry of the mixture may be ball milled. After an intimate mixture is obtained, the water, methanol, or whatever slurrying medium is used, is vaporized in a separate step or during the early stages of the calcination. While this intimate mixture may be calcined at a temperature between about 1400 and 2000° F., the temperature is preferably between 1600 and 2000° F. In order to obtain the highly effective desulfurization catalyst of this invention, it is essential that the calcination be carried out at the prescribed elevated temperatures. If the calcination is carried out at a much lower temperature, or if the mixture of the cobalt and zirconium compound are not calcined (heated) at all, the product mixture will have only weak and unsatisfactory ability to catalyze hydrodesulfurization. The calcination time may be between 1 and 24 hours or more, suitably 3 to 18 hours. Because the catalytic material is produced at such an elevated temperature and is stable at such temperatures, it has an inherent advantage over other desulfurization catalysts wherein the temperature of regeneration of the catalyst must be carefully controlled to about 1200° F. or lower to avoid sintering and deactivation.

The calcination product is a dark or gun metal gray in color. It is caky in texture. It may be used in a desulfurization process in the form of fragments as obtained from the calcination step, or it may be pulverized and pelleted with the aid of 1–2% of Sterotex (hydrogenated corn oil), stearic acid, or the like which are employed as binders and subsequently burned from the pellets. If the catalyst is employed in pelleted form, it is preferred to pellet it together with a carrier such as activated alumina, bauxite, or the like. The various carriers or spacing agents, upon which the calcination product may be extended, can be incorporated in the finished catalyst by pulverizing the carrier material e. g. activated alumina, hydrous alumina gel, commingling it with the pulverized calcination product, then pelleting it with the aid of a binder, and finally burning the binder therefrom with dilute oxygen at a temperature of about 500 to 1000° F. (but not higher than 1200° F.). When the calcination product is extended upon a carrier material, the finished catalyst may be somewhat less selective for desulfurization in preference to paraffination of the olefins present in the oil, especially at very high desulfurization levels. Therefore, when higher selectivity is desired, it is preferred to use the calcination products without extension or dilution with a carrier or supporting material. When hydrogenation of the olefins is a matter of little consequence e. g. when the product is to be hydroformed, the calcination product is preferably supported on a carrier such as alumina in order to reduce the cost of the finished catalyst.

Hydrocarbon oils which may be desulfurized are those such as petroleum and fractions thereof, coal hydrogenation oils, shale oil, and the like which contain objectionable amounts of sulfur compounds, nitrogen compounds and oxygen compounds. The oil may be a virgin or cracked distillate. Virgin or cracked naphthas are particularly suitable feeds to the process of this invention, although higher boiling oils e. g. kerosene, gas oil, etc. may be employed. Olefinic naphthas such as contain an olefin to paraffin ratio in the range of 3:1 to 1:3 are particularly suitable feed stocks because minimum saturation of the olefin content occurs during the hydrodesulfurization process. An outstanding example of a high sulfur olefinic naphtha is a naphtha produced by the coking of a high sulfur reduced crude by conventional methods such as delayed coking or fluidized coking methods. Such a naphtha is exceedingly more difficult to desulfurize by conventional methods than are the olefinic naphthas produced by thermal cracking or by catalytic cracking.

The hydrocarbon oil is desulfurized by passing it together with hydrogen through the reactor containing the catalyst. The catalyst may be contained in the reactor in tubes, trays, or other appropriate containers, or it may be employed in the fluidized state. The conditions employed in desulfurization when using our catalyst will of course vary to some extent dependent upon the type of hydrocarbon oil to be desulfurized and the extent of desulfurization desired. A temperature of 600 to 1000° F. may be used, the higher temperatures being employed in desulfurizing higher boiling feed stocks. When desulfurizing naphtha fractions a temperature of about 600 to 800° F., preferably about 750° F., may be employed. Under such conditions the naphtha is desulfurized while in the vapor state, whereas when desulfurizing a gas oil, a liquid phase is present. A pressure ranging from about 100 to 3000 p. s. i. g. or higher may be employed in the reactor. The oil is contacted with the catalyst in the presence of hydrogen which may be employed in the amount of 500 to 5000, preferably 1500 to 3000 s. c. f./bbl. oil. The hydrogen may consist of introduced outside hydrogen as is employed in a conventional hydrofining type operation, or it may be generated within the reactor by dehydrogenation of the naphthenes present in the feed stock as occurs in "autofining." Space velocities of between 0.5 to as high as 20 volumes of oil per hour per volume of catalyst, preferably between 2 to 10 volumes of oil per hour per volume of catalyst, may be employed.

The higher space velocities are used with the more easily desulfurized stocks such as virgin naphtha, whereas the lower space velocities of about 2 to 5 are employed with the more difficultly desulfurized stocks such as coke still naphtha, higher boiling stocks such as gas oils, and the like.

After the catalyst has been used for a sufficient length of time so that its activity begins to decline, it may be regenerated by burning the hydrocarbonaceous material therefrom employing diluted oxygen such as a mixture of fluegas with air. Because of the thermal stability of the catalyst, the temperature of regeneration need not be kept below 1200° F. as is necessary to avoid deactivation of presently available commercial hydrodesulfurization catalysts. The temperature may be as high as about 1600–1800° F. Regeneration at higher temperatures is more rapid and the down-time of the hydrodesulfurization unit can be decreased. Not only will the use of our catalyst minimize costly equipment necessary to control regeneration of the catalyst, but it will have the added economic incentive of reducing unit down-time.

The effectiveness of the calcination product of the cobalt and zirconium compound was demonstrated in a number of experiments. In the experiments a series of runs were carried out employing the various catalysts. In all of the series of runs the hydrodesulfurization was carried out in an identical manner. Samples of the catalyst composition (30 to 60 cc.) were placed in the center section of an electrically heated one inch (I. D.) stainless steel vertical reactor approximately 36 inches long. A glass bead section was employed below the catalyst to support it, and glass beads were packed above the catalyst to act as a preheat section for the incoming feed. Coke still naphthas (which were obtained from the delayed coking of a mixture of high sulfur reduced crudes primarily of West Texas origin) having sulfur contents of 0.44 to 0.63% and bromine numbers of 65 to 74 were passed together with once-through hydrogen (at a rate approximating 2000 s. c. f./bbl. of naphtha) through the top of the down flow reactor. The total effluent was collected in a pressurized receiver and the naphtha condensed therein. The runs were carried out at a temperature of about 750° F., a pressure of 1000 p. s. i. g., and a liquid hourly space velocity of about 2.0. A number of fractions of the desulfurized product naphtha were collected during each run and the sulfur content and bromine number of the fractions were determined. The percentage reduction of the sulfur content and the percentage reduction in the bromine number were calculated. The percentage reduction in the bromine number was expressed as percentage of paraffination.

The catalyst employed in the first run was prepared by heating 178.2 grams of $CoCO_3$ and 46.3 grams of freshly precipitated $ZrO_2$ (4:1 molar ratio of Co:Zr). Sufficient methanol (175 cc.) was added to make a slurry and the mixture was then ball milled for 3 hours. The intimate mixture was removed from the mill, methanol evaporated on a steam bath, and then placed in a muffle furnace and heated at 1630° F. overnight (18 hours). The dark gray caked fragments were screened to remove fines and granules of about 6 mesh were then used in the reactor. The catalyst used in Run 2 was prepared by ball milling 106.3 grams of $Co_2O_3$ and 46.3 grams of $ZrO_2$ (4:1 molar ratio of Co:Zr). The intimate mixture produced was placed in the hydrofining reactor without any prior heating or calcination. The results obtained with the 2 described catalyst masses are shown in Table I which follows:

Table I

RUN NO. 1

[Catalyst: $CoCO_3 + ZrO_2$ calcined at 1630° F.]

| Vol. feed/Vol. catalyst | Percent Desulfurization | Percent Paraffination | Selectivity [1] |
|---|---|---|---|
| 7 | 98 | 74 | 1.32 |
| 14 | 99 | 78 | 1.27 |
| 21 | 98 | 81 | 1.21 |
| 28 | 98 | 81 | 1.21 |

RUN NO. 2

[Catalyst: $Co_2O_3 + ZrO_2$ non-calcined.]

| Vol. feed/Vol. catalyst | Percent Desulfurization | Percent Paraffination | Selectivity |
|---|---|---|---|
| 8.33 | 64.6 | | |
| 16.67 | 64.7 | | |
| 25.0 | 62.8 | | |
| 33.3 | 60.5 | | |

[1] Selectivity = percent desulfurization ÷ percent paraffination.

It is apparent from the above results that the catalyst prepared by calcining the cobalt and zirconium compounds at a highly elevated temperature (1630° F.) is much superior for desulfurization to the mixture which had not been calcined. Almost complete desulfurization (98–99%) was obtained with our catalyst whereas with the non-calcined mixture the desulfurization ranged only between 54 and 65% for the various fractions collected. While no quantitative results were obtained regarding the extent of paraffination when using the non-calcined mixture, the indications were that our catalyst was much more selective for desulfurization over paraffination than was the non-calcined mixture. By comparison, a commercial cobalt oxide-molybdena oxide-alumina catalyst (3% CoO and 9% $MoO_3$) provided 95% desulfurization and 93% paraffination under the same operating conditions. Thus our catalyst is a more efficient desulfurization catalyst and also much more selective (1.3 vs. 1.0) than the widely used cobalt oxide-molybdena oxide-alumina catalyst.

An additional series of runs were carried out under the above described operating conditions but using samples of our catalyst which had been prepared with different molar ratios of cobalt to zirconium, catalyst prepared at different calcination temperatures, and alumina-supported as well as non-supported catalysts. The catalyst employed in Run 3 was prepared by ball milling a methanol slurry of $CoCO_3$ and $ZrO_2$ (1:1 molar ratio), and then calcining the intimate mixture at 1430° F. for about 18 hours. The calcination product was then mixed with 75% by weight of activated alumina and pelleted together with about 2% of Sterotex as a binder, after which the latter was burned from the catalyst with dilute oxygen at about 800° F. The catalyst employed in Run 4 was prepared by ball milling a methanol slurry of $CoCO_3$ and $ZrO_2$ (2:1 molar ratio), and then calcining the intimate mixture at 1430° F. for about 18 hours. The calcination product was used as such without pelleting. The results obtained with these catalysts of our invention are shown in Table II which follows:

Table II

RUN NO. 3

[Catalyst: $CoCO_3$ + $ZrO_2$ (1:1 molar ratio) on 75 wt. percent alumina.]

| Vol. feed/Vol. catalyst | Percent Desulfurization | Percent Paraffination | Selectivity [1] |
|---|---|---|---|
| 4.17 | 59 | 29 | 2.0 |
| 8.34 | 73 | 37 | 2.0 |
| 12.5 | 76 | 42 | 1.8 |
| 16.67 | 77 | 51 | 1.5 |

RUN NO. 4

[Catalyst: $CoCO_3$ + $ZrO_2$ (2:1 molar ratio) unsupported.]

| 4.17 | 82 | 55 | 1.5 |
|---|---|---|---|
| 8.34 | 87 | 49 | 1.8 |
| 12.5 | 73 | 44 | 1.6 |
| 16.67 | 60 | 27 | 2.2 |

[1] Selectivity = percent desulfurization ÷ percent paraffination.

It is apparent from the above data that the molar ratio of cobalt to zirconium in the mixture subjected to calcination may be from 1:1 to 4:1. Run 3 indicates that the calcination product may be extended on an alumina carrier while still retaining its high ability to desulfurize the oil selectively in preference to hydrogenating the olefins contained therein.

Although the present invention has been described with reference to specific embodiments thereof, the invention is not to be understood as limited thereto but includes within its scope such modifications and variations as would occur to one skilled in this art.

We claim:

1. The method of desulfurizing a hydrocarbon oil containing organic sulfur compounds which comprises contacting said oil in the presence of hydrogen at a temperature between about 600° and 1000° F. with a catalyst containing as the essential component the calcination product of an intimate mixture of a cobalt compound affording an oxide of cobalt and a zirconium compound affording an oxide of zirconium, the mixture containing between about 1 and 4 mols of cobalt per mol of zirconium, and the calcination product being formed by heating the mixture at a temperature between about 1400° and 2000° F. for a period of about 1 to 24 hours.

2. The method of claim 1 wherein said catalyst is prepared by heating to a temperature between about 1600° and 2000° F. for a period of about 1 to 24 hours an intimate mixture of a cobalt compound affording an oxide of cobalt and a zirconium compound affording an oxide of zirconium, the molar ratio of cobalt to zirconium in the mixture being about 4:1.

3. The method of claim 1 wherein the calcination product is extended upon an alumina carrier.

4. The method of claim 1 wherein said hydrocarbon oil is a petroleum naphtha.

5. The method of claim 4 wherein said naphtha is an olefinic naphtha.

6. The method of desulfurizing a petroleum naphtha which comprises contacting said naphtha at a temperature between about 600° and 1000° F. and at a pressure of about 100 to 3000 p. s. i. g. in the presence of hydrogen with a catalyst containing as the essential component the calcination product of an intimate mixture of cobalt carbonate and zirconium dioxide, the mixture containing about 4 mols of cobalt per mol of zirconium, and the calcination product being formed by heating the mixture at a temperature between about 1600 and 2000° F. for a period of about 1 to 24 hours.

References Cited in the file of this patent

UNITED STATES PATENTS 2,437,532   Huffman _____ Mar. 9, 1948